US008474254B2

(12) United States Patent
Hughes, IV et al.

(10) Patent No.: US 8,474,254 B2
(45) Date of Patent: Jul. 2, 2013

(54) SYSTEM AND METHOD FOR ENABLING FLOATING OF EARTHMOVING IMPLEMENTS

(75) Inventors: Edward C. Hughes, IV, Fort Wayne, IN (US); Christopher Alan Williamson, West Lafayette, IN (US); Joshua D. Zimmerman, Lafayette, IN (US); Monika Marianne Ivantysynova, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 909 days.

(21) Appl. No.: 12/613,115

(22) Filed: Nov. 5, 2009

(65) Prior Publication Data

US 2010/0162885 A1 Jul. 1, 2010

Related U.S. Application Data

(60) Provisional application No. 61/111,746, filed on Nov. 6, 2008.

(51) Int. Cl.
*F16D 31/02* (2006.01)

(52) U.S. Cl.
USPC .................................. 60/445; 60/459; 60/475

(58) Field of Classification Search
USPC .................... 60/328, 445, 459, 473, 475, 476
See application file for complete search history.

(56) References Cited

U.S. PATENT DOCUMENTS

| | | | | |
|---|---|---|---|---|
| 5,138,838 | A * | 8/1992 | Crosser | 60/445 |
| 5,329,767 | A | 7/1994 | Hewett | |
| 7,430,953 | B2 * | 10/2008 | Bitter | 91/437 |
| 7,543,449 | B2 | 6/2009 | Ivantysynova et al. | |
| 7,942,208 | B2 * | 5/2011 | Hughes et al. | 172/4.5 |
| 2006/0156713 | A1 | 7/2006 | Kadlicko | |
| 2007/0130928 | A1 | 6/2007 | Price | |
| 2007/0144165 | A1 * | 6/2007 | Kobata et al. | 60/459 |
| 2010/0115936 | A1 * | 5/2010 | Williamson et al. | 60/446 |

FOREIGN PATENT DOCUMENTS

| | | |
|---|---|---|
| DE | 10303360 | 8/2004 |
| WO | 2004067969 | 8/2004 |

OTHER PUBLICATIONS

Zimmerman and Ivantysynova; The Effect of System Pressure Level on the energy Consumption of Displacement Controlled Actuator Systems; Published at Conference in Krakou, Poland, Jul. 2008.
Williamson, Zimmerman, Ivantysynova; Efficiency Study of an Excavator Hydraulic System Based on Displacement-Controlled Actuators; Published at Conference in Bath, UK, Sep. 2008.

* cited by examiner

*Primary Examiner* — Michael Leslie
(74) *Attorney, Agent, or Firm* — Hartman Global IP Law; Gary M. Hartman; Domenica N. S. Hartman

(57) ABSTRACT

A system and method for performing a floating function in an earthmoving implement of an earthmoving machine without physically connecting chambers within a hydraulic actuator that is adapted to raise and lower the earthmoving implement. The system includes a device for delivering a pressurized fluid to and receiving pressurized fluid from the actuator, a valve for compensating for differences in volume between chambers of the actuator, and an electronic control circuit that includes electronic sensors for sensing the pressures in the chambers of the actuator, and a controller for receiving outputs of the sensors. The controller calculates an amount of the pressurized fluid that, when delivered to or received from the actuator, achieves a substantially constant pressures in the chambers of the actuator and enables the earthmoving implement to float regardless of motion of the actuator.

14 Claims, 2 Drawing Sheets

SYSTEM AND METHOD FOR ENABLING FLOATING OF EARTHMOVING IMPLEMENTS

CROSS REFERENCE TO RELATED APPLICATIONS

This application claims the benefit of U.S. Provisional Application No. 61/111,746, filed Nov. 6, 2008, the contents of which are incorporated herein by reference.

BACKGROUND OF THE INVENTION

The present invention generally relates to systems for operating hydraulic circuits. More particularly, this invention relates to a hydraulic system for controlling the position of a working (earthmoving) implement on an earthmoving machine, for example, a blade of an excavator.

Compact excavators are an example of multi-functional earthmoving machines that often have multiple standard functions. FIG. 1 illustrates a compact excavator 100 as having a cab 101 mounted on top of an undercarriage 102 via a swing bearing (not shown) or other suitable device. The undercarriage 102 includes tracks 103 and associated drive components, such as drive sprockets, rollers, idlers, etc. The excavator 100 is further equipped with a blade 104 and an articulating mechanical arm 105 comprising a boom 106, a stick 107, and an attachment 108 represented as a bucket, though it should be understood that a variety of different attachments could be mounted to the arm 105. The functions of the excavator 100 include the motions of the boom 106, stick 107 and bucket 108, the offset of the arm 105 during excavation operations with the bucket 108, the motion of the blade 104 during grading operations, the swing motion for rotating the cab 101, and the left and right travel motions of the tracks 103 during movement of the excavator 100. In the case of a compact excavator 100 of the type represented in FIG. 1, the blade 104, boom 106, stick 107, bucket 108 and offset functions are typically powered with linear actuators 109-114, represented as hydraulic cylinders in FIG. 1.

The blade 104 of the excavator 100 and similar earthmoving machines is adapted for moving soil, for example, backfilling a hole or other types of tasks that entail controlling the position of the blade 104 relative to the ground to create a level soil surface, often in spite of changes in machine orientation while driving over uneven ground. In FIG. 1, the blade position is represented as determined by the linear actuators 113 and 114, which may be double-acting, single-rod hydraulic cylinders connected to the blade 104 and the undercarriage 102 of the excavator 100, though it is foreseeable that any number and type of actuators could be used. The flow rate of pressurized oil to the actuators 113 and 114 is typically controlled with a manually-operated hydraulic valve (not shown). This valve commonly includes a position that connects both chambers of the actuators 113 and 114 to each other, allowing the blade 104 to "float" or move freely and follow the contour of the soil surface. The floating function is particularly useful for smoothing soil while driving the excavator 100 backwards and allowing the blade 104 to drag on the ground.

The cylinders that control the blade position of earthmoving machines can also be directly controlled with a hydraulic pump. Several pump-controlled hydraulic systems are known that use constant and variable displacement pumps. If the blade hydraulic system utilizes a variable displacement pump connected to a single-rod actuator in a closed hydraulic circuit, one or more valves typically connect the circuit to a charge pump and compensate for the difference in volume between the two chambers of the actuator resulting from the presence of the rod within one of the chambers. This volumetric compensation may be achieved with a single spool-type valve (such as in U.S. Pat. No. 5,329,767), two pilot-operated check valves, or another way. The floating function described previously can be accomplished in a pump-controlled actuator circuit with the addition of one or more valves for switching pilot lines. In both valve-controlled and pump-controlled circuits, the actuator floating function is achieved by physically connecting the two actuator hydraulic lines together with one or more valves.

BRIEF DESCRIPTION OF THE INVENTION

The present invention provides a system and method for performing a floating function in an earthmoving implement of an earthmoving machine without physically connecting chambers within a hydraulic actuator that is adapted to raise and lower the earthmoving implement.

According to a first aspect of the invention, the system includes a device for delivering a pressurized fluid to and receiving pressurized fluid from the actuator and the chambers thereof separated by a piston within the actuator, at least one valve adapted to compensate for differences in volume between chambers of the actuator, and an electronic control circuit comprising electronic sensors for sensing the pressures in the chambers of the actuator, and a controller for receiving outputs of the sensors. The controller calculates an amount of the pressurized fluid that must be delivered to or received from the actuator to achieve substantially constant pressures in the chambers of the actuator, and controls the delivering-receiving device to deliver or receive the amount of the pressurized fluid to achieve the substantially constant pressures in the chambers of the actuator and enable the earthmoving implement to float regardless of motion of the actuator.

According to a second aspect of the invention, the method includes delivering a pressurized fluid to and receiving pressurized fluid from the actuator and the chambers thereof separated by a piston within the actuator, compensating for differences in volume between the chambers of the actuator, and operating an electronic control circuit to sense the pressures in the chambers of the actuator, calculate an amount of the pressurized fluid that must be delivered to or received from the actuator to achieve substantially constant pressures in the chambers of the actuator, and control the delivering-receiving means to deliver or receive the amount of the pressurized fluid to achieve the substantially constant pressures in the chambers of the actuator and enable the earthmoving implement to float regardless of motion of the actuator as the earthmoving machine (14) travels over an uneven surface.

Another aspect of the invention is an earthmoving machine equipped with the system described above.

In view of the above, it can be seen that a significant advantage of this invention is the ability to achieve a desired floating functionality for an implement without additional valves conventionally required to physical connect chambers of the actuators used to raise and lower the implement. An optional advantage is the ability to adjust the floating action, and specifically the contact force between the implement and the soil, by maintaining a non-zero pressure difference within the chambers of the actuator. This capability allows an operator to more precisely control the amount of soil moved by the implement.

Other aspects and advantages of this invention will be better appreciated from the following detailed description.

DETAILED DESCRIPTION OF THE INVENTION

Figure 1:
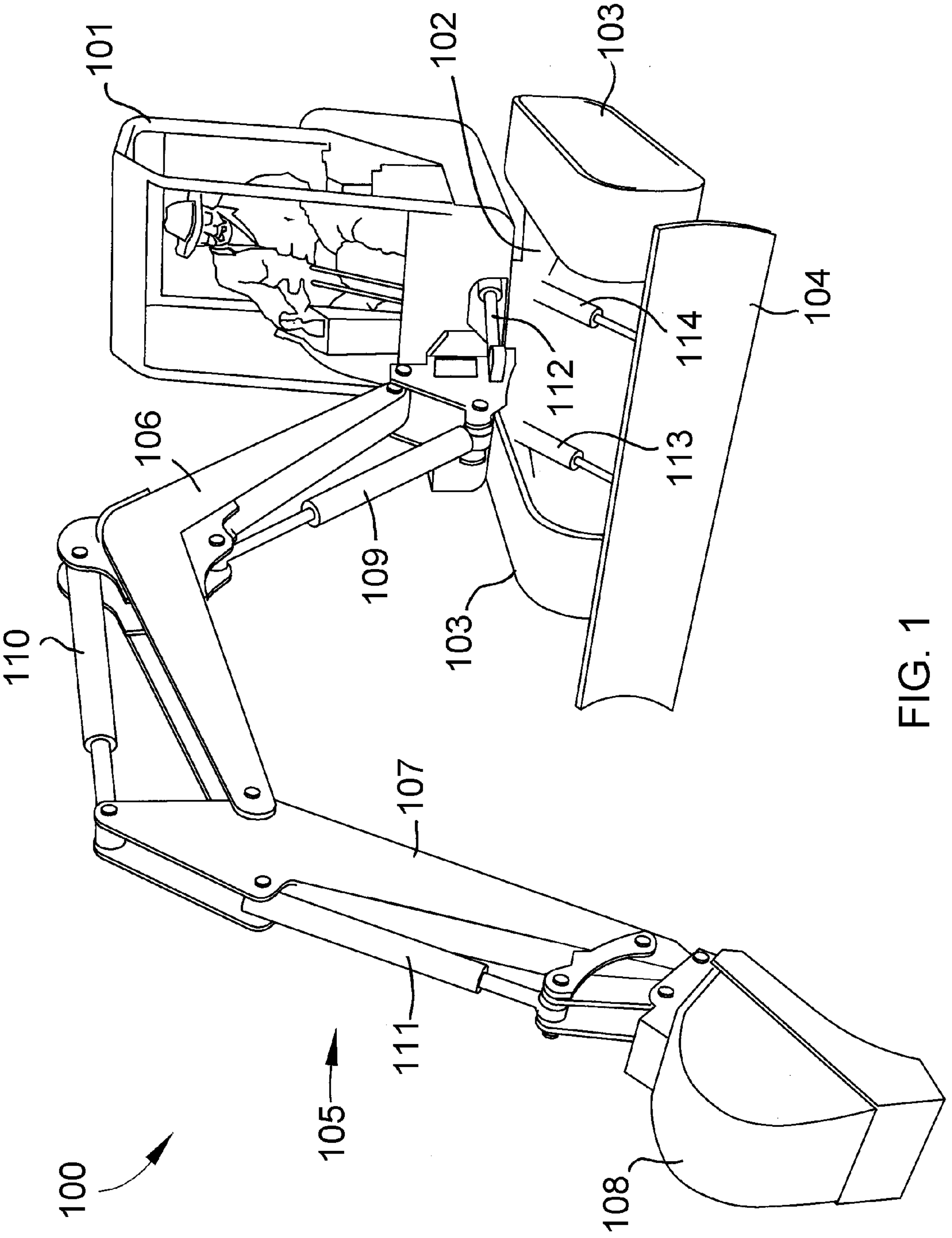
FIG. 1 schematically represents a compact excavator of a type known in the prior art.
Figure 2:
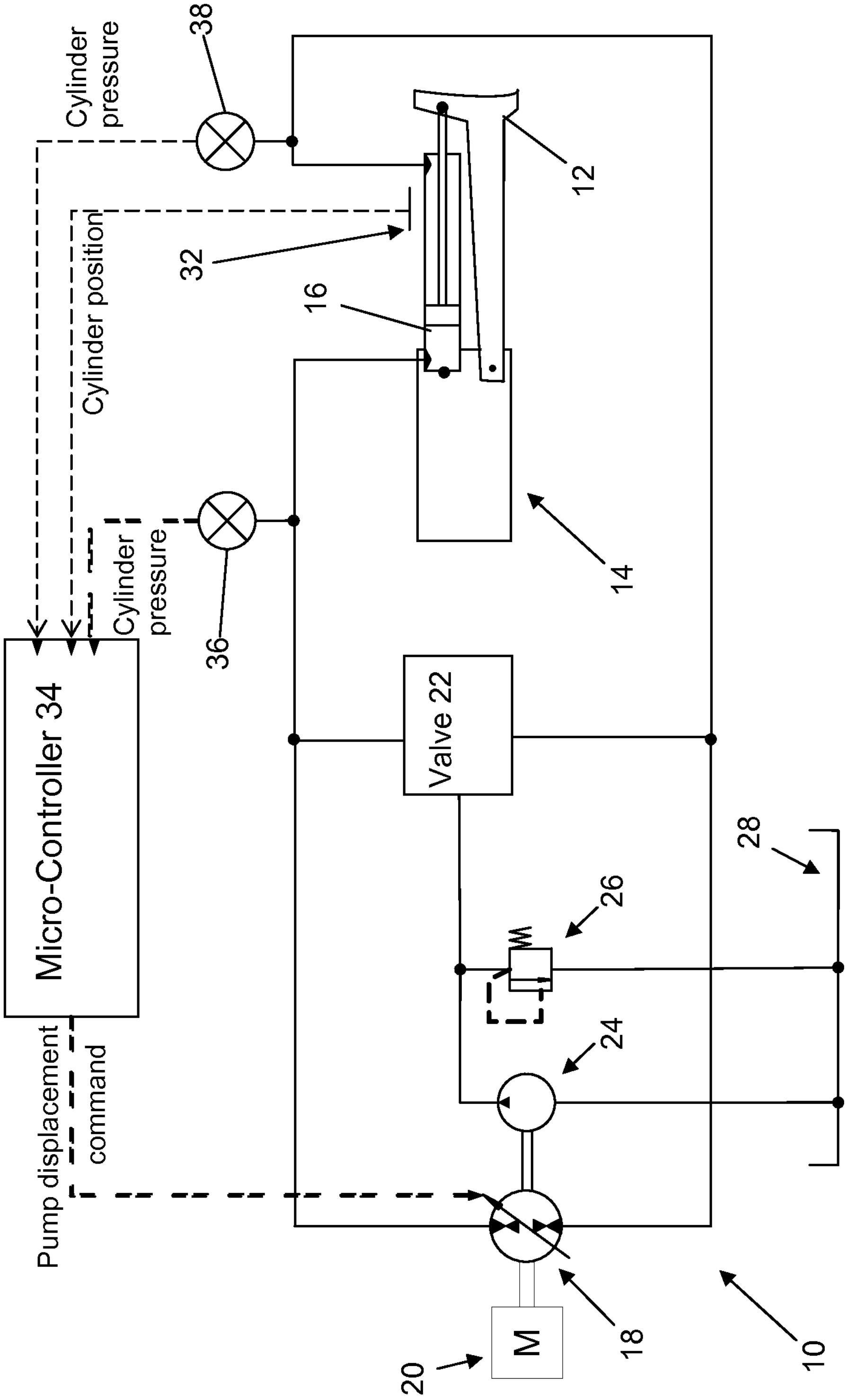
FIG. 2 represents a pump-controlled actuator circuit for implementing a blade floating function in an earthmoving machine in accordance with an embodiment of this invention.

FIG. 2 schematically represents a system 10 for implementing a floating function for a blade 12 of an earthmoving machine 14. The system 10 is represented in FIG. 2 as comprising a closed hydraulic circuit containing a pump-controlled hydraulic actuator 16 adapted to control the movement of the blade 12, including raising, lowering and leveling of the blade 12 relative to the machine 14. The actuator 16 is preferably one of multiple actuators (not shown) connected to the blade 12, similar to the linear actuators 113 and 114 used to control the blade 104 of the excavator 100 of FIG. 1. The invention is also suited for use with other types of earthmoving machines, such as wheel loaders and skid-steer loaders that are commonly equipped with a blade or another earthmoving implement.

As represented in FIG. 2, the actuator 16 is represented as a double-acting, single-rod hydraulic cylinder connected to the blade 12 and to a suitable frame structure of the machine 14, enabling the actuator 16 to control the position of the blade 12 relative to the machine 14 and the ground surface (not shown) beneath the machine 14. The flow rate of pressurized oil or other suitable hydraulic fluid to the actuator 16 is controlled with a variable displacement pump 18, which may be powered by a primary power source 20, for example, an internal combustion engine. One or more valves 22 connect the circuit to a charge pump 24 and compensate for the difference in volume between the two chambers of the actuator 16, with excess hydraulic fluid being returned through a pressure relief valve 26 to a reservoir 28 from which the charge pump 24 draws the fluid.

The blade 12 is effectively able to float when the hydraulic pressures within the chambers of the actuator 16 separated by the actuator's piston remain essentially constant, regardless of actuator motion. The system 10 utilizes an electronic control system containing electronic sensors that sense the hydraulic pressures within the actuator 16 and provide an indication of the position (extension/retraction) of the actuator 16. In the embodiment of FIG. 2, the electronic control system is represented as containing an electronic position sensor 32 for sensing the position of the piston rod of the actuator 16 and electronic pressure sensors 36 and 38 for measuring the hydraulic pressures within the chambers of the actuator 16. The signals of the sensors 32, 36 and 38 are sent to a digital micro-controller 34, where a desired actuator flow rate is calculated based on the chamber pressures sensed within the actuator 16 by the sensors 36 and 38 and the chamber pressures necessary to allow the blade 12 to float. The micro-controller 34 executes a feedback control algorithm and sends a command signal to an electro-hydraulic valve (not shown), which regulates the displacement of the pump 18 to control the flow rate of the pump 18 in a manner that maintains approximately equal pressures within the cylinder chambers regardless of the piston motion within the actuator 16. The position sensor 32 is connected to the micro-controller 34 to provide feedback as to if and when the limits of the cylinder stroke have been reached, and then reduce the flow rate to the actuator 16 accordingly.

Alternate configurations to that of FIG. 2 are also possible. For example, an angular position sensor could be attached to the actuator(s) 16 or blade joints instead of the linear position sensor 32 attached to the actuator 16. Another possible alternative is to employ a set of proximity sensors that detect when the cylinder stroke limit has been reached, without continuously measuring the piston rod position throughout its entire range. Furthermore, the invention could be implemented in a valve-controlled hydraulic circuit with an electrically actuated hydraulic valve.

A particular advantage of the system 10 as described above is the ability to achieve the desired floating functionality without additional valves. Instead, the system 10 can employ pressure and position sensors of the type often installed on machines equipped with a pump-controlled actuator circuits to control actuator position and velocity. In this case, the invention adds functionality at minimal additional cost. Another advantage is the ability to adjust the floating action, and specifically the contact force between the blade 12 and the soil. In the prior art, the contact force between the blade 12 and soil is primarily due to the weight of the blade 12 and cannot be adjusted. With the present invention, the blade contact force can be varied by regulating the actuator flow rates in the manner as described above, but maintaining a non-zero pressure difference across the piston of the actuator 16. This capability allows the operator to more precisely control the amount of soil moved. Other aspects and advantages of this invention will be appreciated from further reference to FIG. 2.

While the invention has been described in terms of a specific embodiment, it is apparent that other forms could be adopted by one skilled in the art. For example, the functions of each component of the system could be performed by components of different construction but capable of a similar (though not necessarily equivalent) function. Accordingly, it should be understood that the invention is not limited to the specific embodiment illustrated in the Figures. Instead, the scope of the invention is to be limited only by the following claims.

The invention claimed is:

1. A system for performing a floating function in an earthmoving implement of an earthmoving machine without physically connecting chambers within a hydraulic actuator that is adapted to raise and lower the earthmoving implement, the system comprising:

means for delivering a pressurized fluid to and receiving pressurized fluid from the actuator and the chambers thereof separated by a piston within the actuator;

at least one valve adapted to compensate for differences in volume between chambers of the actuator; and an electronic control circuit comprising electronic sensors for sensing the pressures in the chambers of the actuator, and a controller for receiving outputs of the sensors, calculating an amount of the pressurized fluid that must be delivered to or received from the actuator to achieve substantially constant pressures in the chambers of the actuator, and controlling the delivering-receiving means to deliver or receive the amount of the pressurized fluid to achieve the substantially constant pressures in the chambers of the actuator and enable the earthmoving implement to float regardless of motion of the actuator.

2. The system according to claim 1, wherein the electronic control circuit further comprises at least one electronic sensor adapted to sense the position of the actuator and provide feedback as to if and when a stroke limit of the actuator has been reached.

3. The system according to claim 1, wherein the machine is an excavator.

4. The system according to claim 1, wherein the earthmoving implement is a blade.

5. The system according to claim 4, wherein the controller is operable to select and maintain a contact force between the blade and a surface beneath the blade by controlling the delivering-receiving means to achieve the substantially constant pressures in the chambers of the actuator and maintain a non-zero pressure difference between the chambers.

6. The system according to claim 1, wherein the system is installed on the earthmoving machine.

7. The earthmoving machine equipped with the system of claim 6.

8. A method of performing a floating function in an earthmoving implement of an earthmoving machine without physically connecting chambers within a hydraulic actuator that is adapted to raise and lower the earthmoving implement, the method comprising:

delivering a pressurized fluid to and receiving pressurized fluid from the actuator and the chambers thereof separated by a piston within the actuator;

compensating for differences in volume between the chambers of the actuator; and operating an electronic control circuit to sense the pressures in the chambers of the actuator, calculate an amount of the pressurized fluid that must be delivered to or received from the actuator to achieve substantially constant pressures in the chambers of the actuator, and control the delivering and receiving of the pressurized fluid to deliver or receive the amount of the pressurized fluid to achieve the substantially constant pressures in the chambers of the actuator and enable the earthmoving implement to float regardless of motion of the actuator as the earthmoving machine travels over an uneven surface.

9. The method according to claim 8, further comprising sensing the position of the actuator and providing feedback as to if and when a stroke limit of the actuator has been reached.

10. The method according to claim 8, wherein the machine is an excavator.

11. The method according to claim 8, wherein the earthmoving implement is a blade.

12. The method according to claim 11, wherein the electronic control circuit operates to select and maintain a contact force between the blade and a surface beneath the blade by controlling the delivering and receiving of the pressurized fluid to achieve the substantially constant pressures in the chambers of the actuator and maintain a non-zero pressure difference between the chambers.

13. The system according to claim 1, wherein the delivering-receiving means is a variable displacement pump.

14. The method according to claim 8, wherein delivering the pressurized fluid to and receiving the pressurized fluid from the actuator and the chambers thereof is performed by a variable displacement pump.

* * * * *